US008056275B2

(12) United States Patent
Ballew

(10) Patent No.: US 8,056,275 B2
(45) Date of Patent: Nov. 15, 2011

(54) WATERLESS SYSTEM FOR PROVIDING FAN-SHAPED FOUNTAIN EFFECT

(75) Inventor: Charles Summers Ballew, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 56 days.

(21) Appl. No.: 12/542,807

(22) Filed: Aug. 18, 2009

(65) Prior Publication Data

US 2011/0045227 A1 Feb. 24, 2011

(51) Int. Cl.
*G09B 11/00* (2006.01)

(52) U.S. Cl. ........................................ 40/435; 40/431

(58) Field of Classification Search ............ 40/427–433; 362/253, 644

See application file for complete search history.

(56) References Cited

U.S. PATENT DOCUMENTS

| | | | | | |
|---|---|---|---|---|---|
| 1,445,977 | A | * | 2/1923 | Shephard | 40/433 |
| 2,147,232 | A | * | 2/1939 | Ballew | 40/433 |
| 2,513,100 | A | * | 6/1950 | Jens | 40/435 |
| 2,795,065 | A | * | 6/1957 | Jean et al. | 40/435 |
| 2,798,324 | A | * | 7/1957 | Berger et al. | 40/435 |
| 2,811,798 | A | * | 11/1957 | Brooks | 40/431 |
| 2,857,507 | A | * | 10/1958 | Stec | 40/432 |
| 3,030,944 | A | * | 4/1962 | Blau | 600/558 |
| 3,142,919 | A | * | 8/1964 | Richardson | 40/421 |
| 3,900,978 | A | * | 8/1975 | Sloan | 40/435 |
| 5,672,057 | A | * | 9/1997 | Engel | 434/84 |
| 6,513,951 | B1 | * | 2/2003 | Wang et al. | 362/253 |
| 6,592,423 | B1 | * | 7/2003 | Boyle et al. | 446/175 |
| 7,056,006 | B2 | * | 6/2006 | Smith | 362/644 |

* cited by examiner

*Primary Examiner* — Joanne Silbermann
*Assistant Examiner* — Shin Kim
(74) *Attorney, Agent, or Firm* — Marsh Fischmann & Breyfogle LLP; Kent A. Lembke

(57) ABSTRACT

An apparatus for creating a water disk effect without water. The apparatus includes first and second disks, each having a first side with a substantially planar surface and a second side with a surface textured with a three dimensional (3D) pattern or topography including raised, arcuate ridges in a whirlpool or spiral arrangement. The apparatus includes a housing that supports the first and second disks for independent rotation about a common axis. The disks are positioned such that the first sides are proximate but spaced apart to avoid contact, such that the 3D patterns face outward toward viewers of the apparatus. The apparatus includes a drive assembly rotating the first disk in a first direction and concurrently rotating the second disk in a second direction opposite the first direction. A water disk effect is created during counter rotation when light from the Sun or other source strikes the disks.

19 Claims, 7 Drawing Sheets

WATERLESS SYSTEM FOR PROVIDING FAN-SHAPED FOUNTAIN EFFECT

BACKGROUND OF THE INVENTION

1. Field of the Invention

The present invention relates, in general, to water displays or fountains, optical illusion systems, and special effect devices, and, more particularly, to an apparatus or system for achieving an illusion of a fan-shaped, liquid fountain in a dry or waterless manner.

2. Relevant Background

In many settings, it is desirable to provide a pleasing visual display to enhance a visitor's experience of a park, an entertainment facility, a public building, and so on. Water displays aid fountains are often used to create effects with water and lights may be accompanied by music to create a crowd-pleasing effect. Water displays are becoming increasingly sophisticated and complicated in design and operation with most water displays including a body of water such as pool or lake and numerous remotely-controlled nozzles and/or water display devices. The water display devices are often computer controlled to spray or disperse water in a timed or synchronized pattern. Presently-available water display systems have produced useful water displays and shows, but there have been many barriers toward their more widespread adoption and use.

Existing water display devices are typically submerged in a body of water and may be fixed in place or provided on a movable platform. The movable platform is typically raised and lowered by other submerged components to bring the nozzle or water outlet above the surface of the water during the show, and the movable platform is often quite large. Another problem facing water display designers is how to provide a moving head or nozzle system that can articulate to numerous positions. Such a range of nozzle or water outlet positions is desirable for providing displays and shows with greater variety and allows designers to play with the water to create different looks utilizing fewer fountains or water display devices (and, hence, fewer platforms that have to raised and lowered in the water). Another problem with existing water display systems is alignment of the outlet or nozzle prior to beginning a show or display sequence. With existing fountains and water displays, the alignment process is very labor intensive and inaccurate as workers generally enter the pond or body of water and try to set the nozzle to a home position by hand. Often, this simply involves "eyeballing" the position of the nozzle to reset it into a desired position while standing in water. Such aligning is then repeated periodically as the equipment may tend to become unaligned with use in shows.

In other settings, it may be desirable to provide a fountain in conjunction with moving parts such as within a ride. In other words, the fountain itself may not have moving parts but the nearby portions of a physical support may have moving components such as if the fountain is positioned on top or within an amusement park ride (e.g., a rotating ride structure). In such applications, it may be very difficult and expensive to create a rotary union that allows water to be piped to the fountain without leaking and significant wear and maintenance requirements.

In addition to these challenges presented by fountains and water displays, there are many applications where it is useful to create an effect such as a fan of water, but the use of water may not be desirable or even possible. For example, it may be useful to provide a fan of water within or near an amusement park ride or near the entrance of a building, but the use of water would require plumbing and cause maintenance problems such as to repair leaks and to realign fountain heads. Further, the spray of water may be difficult to control due to wind effects. Still further, it may be undesirable to have water contact nearby structures or equipment as this may cause discoloring of nearby buildings and walls or may detrimentally effect ride or other operating mechanisms (e.g., increase corrosion of mechanical components, require additional lubrication or enclosure components to minimize exposure to moisture). Also, use of water fountains may result in viewers and others nearby getting wet from spray or blown water, when this is not desired or planned.

SUMMARY OF THE INVENTION

The present invention addresses the above problems by providing an assembly or system adapted for providing a water disk effect or optical illusion without requiring use of water (e.g., in a "dry" manner). The assembly includes two counter rotating disks or plates that have a shared or common rotation axis (e.g., one disk rotates clockwise while the other concurrently rotates counterclockwise). Each disk is formed of a material(s) such that it is at least translucent to light such as a plastic, glass, ceramic, or the like that may have an index of refraction similar to that of water. In one case, the index of refraction (and coloring) is selected to match that of water with an index of refraction within about 20 percent of the index of refraction of water while another application calls for an index of refraction for each disk that is at least about 1.3.

The disks may have a similar configuration (or nearly identical configuration as may occur if made from a single mold) with one side or the inner surface being planar. The two disks are arranged in the assembly such that the two planar or inner surfaces are proximate to each other and parallel, but they are spaced apart to support frictionless counter rotation of the paired disks. The second side or outer surface of each of the disks is nonplanar or textured with a pattern including a number or set of side-by-side, raised or protruding ridges, ribs, or refractive elements. The ridges are arcuate or bowed and are arranged in a pattern, which may provide a series of spaced apart walls or jets of water-like features or more typically may provide an illusion of a circular or fan-shaped spray of water. The ridges may be somewhat irregular so as to simulate a more random, natural look of water, and the ridges may spiral loosely toward the center of the disk.

When the disks are rotated and light passes through the disks (e.g., ambient light such as from the Sun or another source), the ridges on both disks distort the light in a similar manner as a fan shaped spray of water. The ridges are "parallel" with similar amounts of curvature or bowing (e.g., with similar defining radii) to provide a repeating pattern and the outward portion of the bend or curve is generally in the same direction on each disk to provide a whirlpool or partial spiral pattern of radial "flowing" water as the disk is rotated. Rotation of each disk is typically in the direction of the bend or bowing of the ridge elements, e.g., if bend is to the left, when viewed along the rotation axis, then the rotation is counterclockwise while if the bend is to the right the rotation may be clockwise. The interference of light being refracted by adjacent or proximate pairs of the ridge elements on the two disks fools or distracts a viewer's eyes such that they see radial, outward movement, and the refraction of light similar to that provided by water makes the movement appear to be flowing water.

More particularly, an apparatus is provided for creating a "dry" water disk effect. The apparatus includes first and second disks, with each disk having a first side with a substantially planar or flat surface (e.g., the inner surfaces of the disk pair) and a second side with a surface textured with a three dimensional pattern or topography (e.g., the outer or outward facing surfaces of the disk pair). The apparatus includes a housing that supports the first and second disks such that they can independently rotate about a common axis that extends generally through the centers of the disks. The disks are positioned in the apparatus such that the first sides with the planar surfaces are proximate to each other but spaced apart to avoid contact, such that the 3D patterns face outward or are visible to viewers of the apparatus. The apparatus also includes a drive assembly that is adapted to rotate the first disk in a first direction about the rotation axis and to concurrently rotate the second disk in a second direction about the rotation axis, with the first and second directions being opposite (such as clockwise and counterclockwise or vice versa). A water disk effect is created during such counter rotation whenever light strikes the disks such as when sunlight is incident on the apparatus.

The 3D pattern may include a number of arcuate or bowed ridges extending generally from a center of the disks toward an outer edge (which may also be textured such as with a serrated appearance or profile). Each of the arcuate, raised ridges may be curved or bowed in a common direction on each disk relative to the centers of the disk, and rotation of each disk may be in the direction of the bow or curve (e.g., from a center of curvature toward the curved ridgeline or the like). The common direction of the curve may coincide with the rotation directions for each of the two disks. The 3D pattern may also include an irregular textured surface within the gap or valley between adjacent pairs of the ridges or arcuate elements. The arcuate ridges may have a relief or height relative to the disk body that is at least about 25 percent of the thickness of the disk (e.g., about 0.5 inches when the disk is 2 inches thick and so on).

The disks may be made of a material or have a composition of material to cause each disk to have an index of refraction of at least about 1.3 (e.g., formed from a water clear urethane resin or the like). The drive assembly may include first and second drive mechanisms mechanically linked to the first and second disks, respectively, for driving the disks at rotation rates in the range of about 20 to about 30 revolutions per minute (RPMs) with some embodiments having the two rotation rates being substantially equal such as within 3 RPMs of each other. The housing may include an enclosure assembly that covers or hides from view an axle or hub member supporting the two disks proximate to the centers of the disks, and the disks may be supported so as to extend into the housing (or behind other view-hiding components/structure) such that at least about one fourth of each disk is hidden from view so as to cause a viewer to more readily believe water is used to create a fan-shaped spray of water effect or illusion and that the water is returned by gravity to the housing (e.g., the full disk shape or body is hidden from viewers).

DETAILED DESCRIPTION OF THE PREFERRED EMBODIMENTS

Briefly, embodiments of the present invention are directed to an assembly that produces an appearance of a water disk as may be produced with a fountain but without the use of any water. Hence, the assembly may be considered a “dry” water disk effect assembly in which no plumbing is required and no concerns of damage or problems associated with spraying water to produce a fan or circular wall. The dry fan or disk effect provided is unaffected by winds that would disrupt a water-based fountain of such shape, and the water is not blown onto viewers or passersby that may wish to stay dry.

Figure 1:
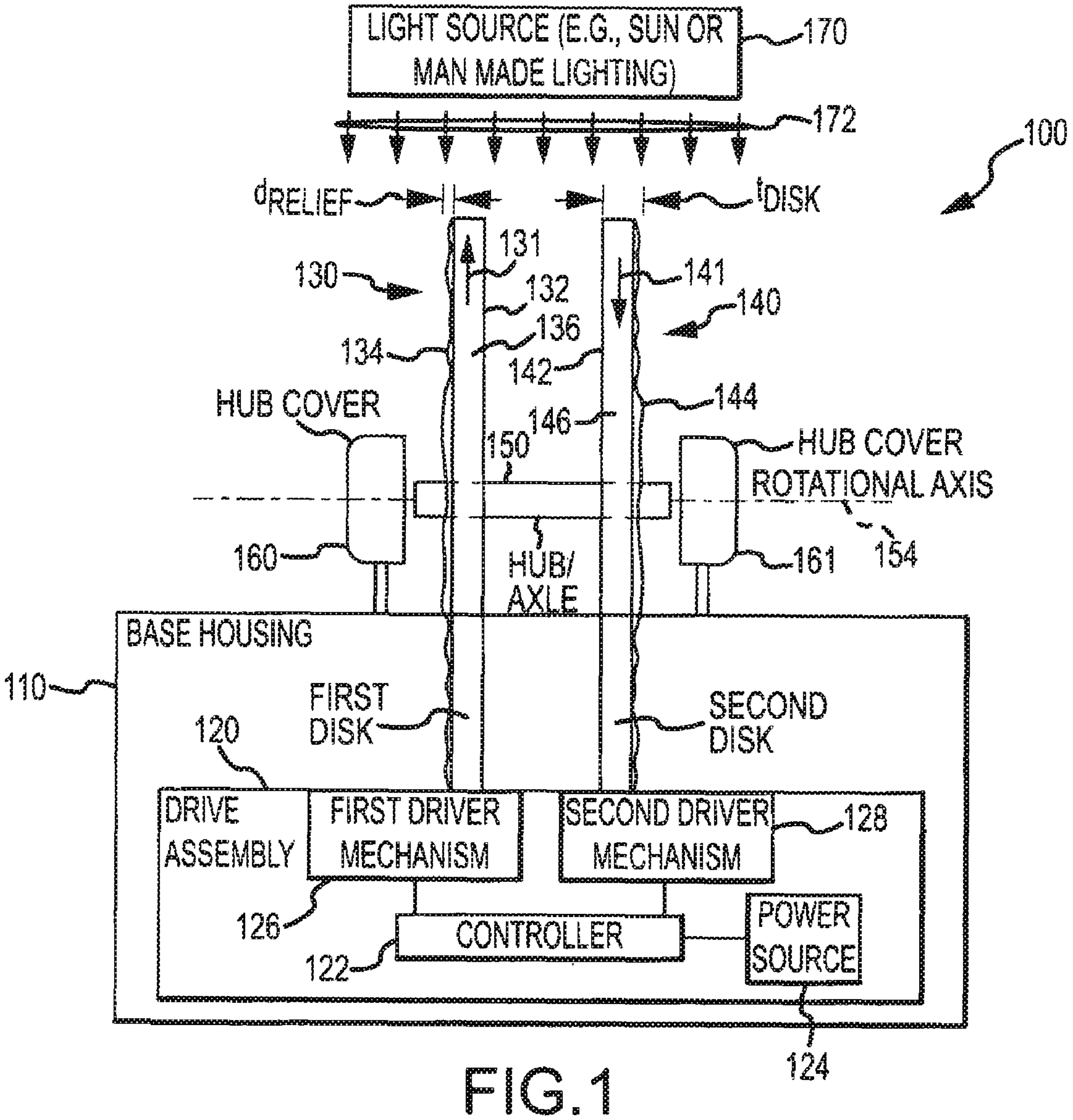
FIG. 1 illustrates in functional block form a water disk effect assembly of an embodiment described herein.

FIG. 1 illustrates a functional block drawing of a water disk effect assembly or system 100 of one embodiment of the invention. As shown, the assembly 100 includes a base housing 110 that supports a drive assembly 120 as well as a pair of hub covers/supports 160, 161. The drive assembly 120 may take many forms and generally, as is described in detail herein, functions to drive two disks 130, 140 in opposite directions or to counter rotate the disks (e.g., one is rotated clockwise while the other is rotated counterclockwise). The drive assembly 120 may include a first driver mechanism 126 and a second driver mechanism 128 to provide such separate and differing rotation of the two disks 130, 140.

The drive mechanisms 126, 128 may be run and/or powered by a controller 122 and power source 124 to rotate the disks 130, 140 as shown at 131, 141 about the hub or axle 150 at desired rotation rates (e.g., 10 to 40 revolutions per minute (RPM) or, in some cases, in the range of 20 to 30 RPMs). In some cases, the controller 122 may be remotely operable to operate the driver mechanisms 126, 128 at one speed or at a number of speeds or may operate in a continuous manner when power is supplied via source 124 such as to rotate the disks 130, 140 at a desired rotation rate to achieve a desired water disk effect (with the speed often being adjusted/tuned to suit a particular disk design (or surface pattern/topography) and other parameters such as lighting levels, material used for the disk bodies, and the like).

Significantly, the assembly 100 includes a pair of disks 130, 140 that are supported by the hub covers 160, 161 on the hub/axle 150, which may extend through a centrally located hole in the disk bodies. The disks 130, 140 typically will extend part way into the housing 110 such that a lower portion of the disks 130, 140 is obscured or hidden from view, whereby viewers are led to believe the “water” is falling down back into the housing. In some embodiments, up to two thirds of the disks 130, 140 extend into the housing 110 whereas in other embodiments at least one fourth of the disks 130, 140 extend into the housing 110 to enhance the fountain or water fan effect. In some embodiments, the disks 130, 140 also extend into the housing 110 such that an edge 136, 146 of each disk 130, 140 contacts a portion of the drive mechanisms 126, 128 such that the driver mechanisms 126, 128 can impart the rotations 131, 141 (such as by using a wheel, belt, gear, or the like that abuts the edge 136, 146). In this manner, the driving of the disks 130, 140 is also hidden from view as is the support at hub 150 by hub covers 160, 161. As shown, each of the disks 130, 140 rotates about a common rotation axis 154 that may extend through the center of the hub 150 and the disks 130, 140, and, in most embodiments, the disks 130, 140 each have an equal or substantially equal outer diameter such that a viewer of the assembly along the rotation axis 154 may not see a hidden or rear one of the disks 130, 140.

The effect provided by assembly 100 is achieved in part by providing the two disks 130, 140 that are each made of a substantially clear or at least mostly light-translucent material such as a glass, a ceramic, or a plastic such as an acrylic. For example, the material used for the bodies of the disks 130, 140 may be chosen to have an index of refraction that is similar to water such as a durable material such as an acrylic or a molded urethane resin that is "water clear" and ultraviolet stabilized. The index of refraction will typically be the same or similar for each of the disks 130, 140 and may be within about 20 percent of water's index of refraction such that it refracts light 172 from a light source 170 similar to water. For example, the index of refraction of the disks 130, 140 may be at least 1.3 such as in the range of 1.3 to 1.5. The disks 130, 140 are illuminated with a light source 170 with light 172 that strikes the disks 130, 140 at nearly any orientation and creates an optical effect as light passes through the disks 130, 140 that the rotating 131, 141 disks 130, 140 are water fans or circular fountains of water rather than being formed of a solid or rigid material. The system 100 may be adapted for using ambient light such as for outdoor use with the light source 170 being the Sun or manmade/provided outdoor lighting. In other cases, lighting sources such as would be used for a standard fountain may be provided such as lights positioned within the base housing 110 or elsewhere.

Each disk 130, 140 has a planar body with a generally circular shape and thickness, $t_{Disk}$ that may vary from less than an inch in some smaller applications (such as less than 0.5 inches for a desk top system 100) to 2 or more inches thick for larger application (such as 2 inches for an outdoor application with a disk OD of up to 7 feet or more). Some embodiments using a single design for each disk 130, 140 (e.g., formed of acrylic from a single mold) while other embodiments provide some variation between the configurations to achieve a desired optical effect. Each disk 130, 140 includes an inner (or inward facing) side or surface 132, 142 that may be substantially planar or smooth to provide a desired refraction of light 172 as it passes through the disk 130, 140. The inner sides 132, 142 are positioned adjacent to each other (facing each other) in the system 100 and spaced apart on the hub/axle 150 to allow counter rotation 131, 141 without friction or contact between the two disks 130, 140.

The disks 130, 140 also include an outer (or outward facing) side or surface 134, 144 that is contoured with a pattern of raised or protruding ridges or ribs that are arcuate or bowed in shape and extend from a disk center toward or to the sidewall or edge 136, 146. Each of the ridges is spaced apart from an adjacent pair of the ridges with each ridge facing a single direction or having its outward curved portion (or convex direction) directed in a like direction to form a pattern with arcuate ridges (e.g., appearing as spokes of a bowed wheel or the like when viewed along the rotation axis 154), and during operation of the system 100, the rotation such as rotation 131 is in the direction of the outward curve or bowing of the ridges/ribs on surface 134.

In addition to the raised, arcuate ridges, the surface 134, 144 may include a non planar or 3D topography in between the ridges (or in the lower surface or the valleys of surface/side 134, 144) to further cause refraction of light as would occur if the disks 130, 140 were formed of a fan or sheet of water. The relief or depth, $d_{Relief}$, of the valleys (or height of the ridges) on surfaces 134, 144 may also vary to practice the system 100, but, in some embodiments, the relief is about 25 to 50 percent or more of the disk thickness, $t_{Disk}$ (e.g., a disk 130, 140 with a thickness, $t_{Disk}$, of 2 inches may have a relief, $d_{Relief}$, of 0.5 to 1 inches) To further the water fan effect, the sidewalls 136, 146 may also be formed with an irregular pattern or surface such as a jagged edging with peaks and valleys (or a serrated pattern) simulating an irregular travel of water spouts or jets from fountain nozzles.

Figure 2:
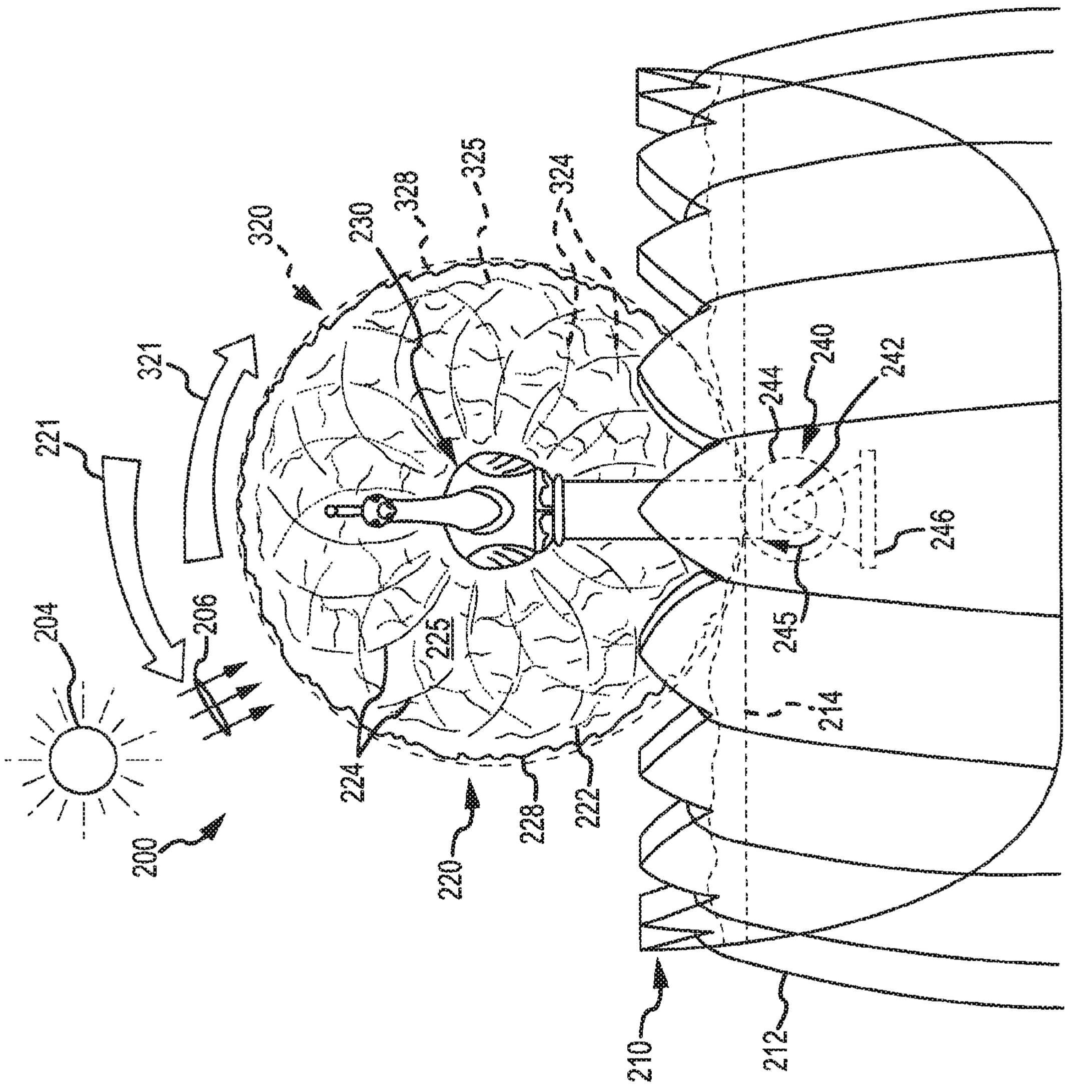
FIG. 2 is a front view of one embodiment of a water disk effect assembly (such as a practical implementation of the assembly shown in FIG. 1)
Figure 3:
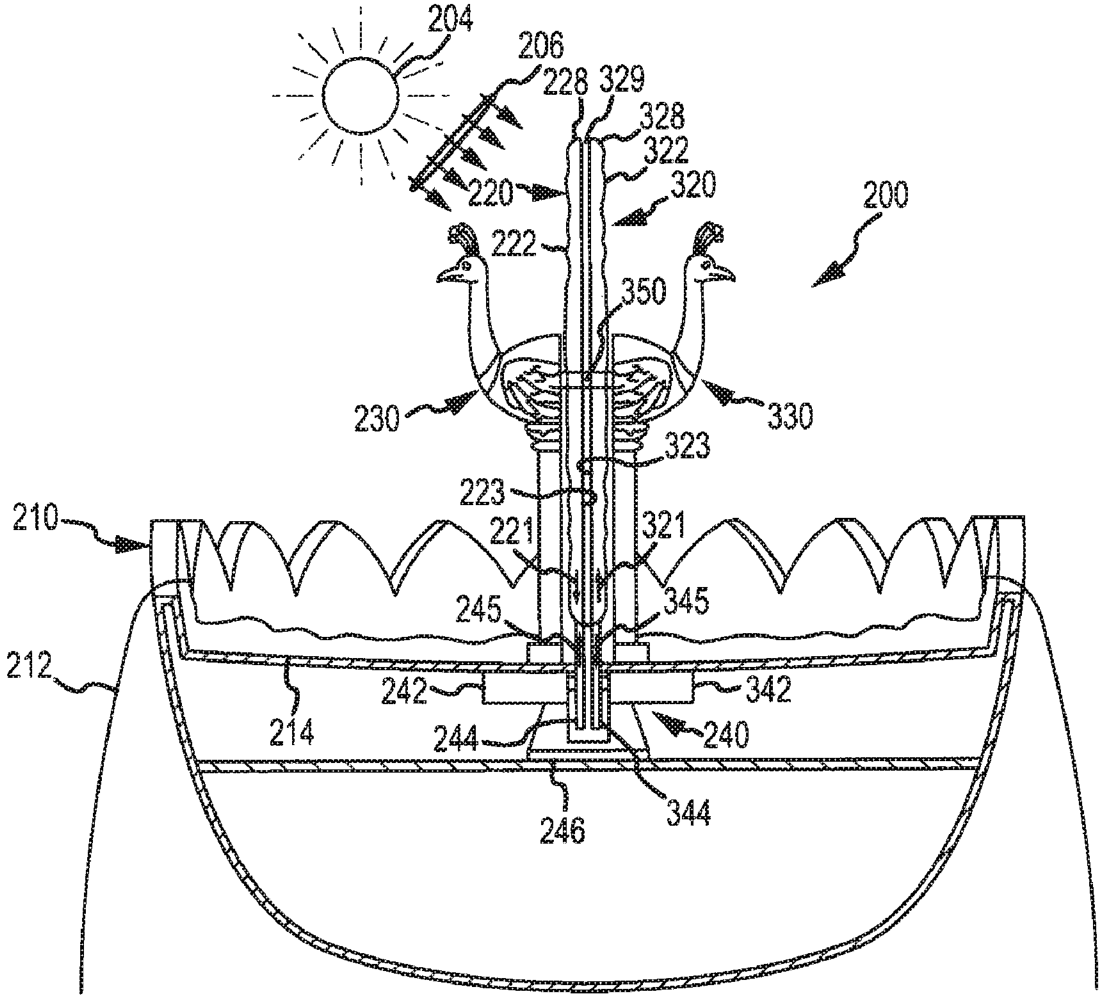
FIG. 3 is a side or edge view of the assembly of FIG. 2 showing the counter-rotating, spaced apart disks used to create a fountain/water effect in a dry or waterless manner.
Figure 4:
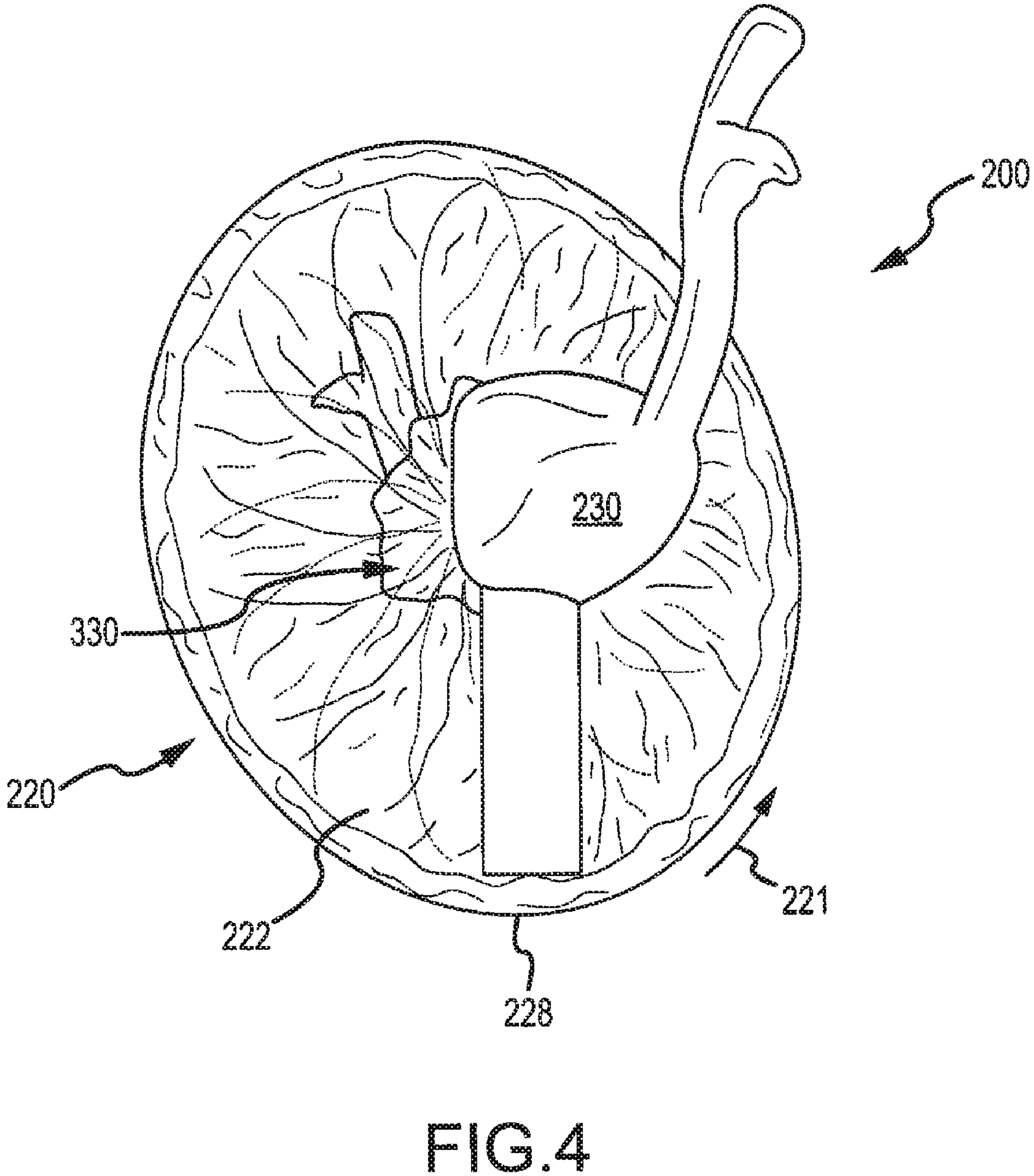
FIG. 4 is a perspective view of the assembly of FIGS. 2 and 3 with the base assembly removed showing the achieved water disk effect.

FIGS. 2-4 illustrate one embodiment of a water disk effect assembly or system 200 that may be used to create a water disk or fan effect without spraying water into the air. The assembly 200 may utilize an ambient light source 204 (such as the Sun) or the like to provide light 206 for illumination. To refract the light 206 in a desirable manner, the assembly 200 includes a pair of disks 220, 320 that rotate in opposite directions as shown at 221, 321. For example, when viewed from disk 220 side, the disk 220 is rotated 221 counterclockwise while the disk 320 is rotated 321 clockwise. As shown in FIG. 2, the disks 220, 320 are supported and positioned within a base or housing 210 above floor or platform 214, which may have water 212 flowing over it and out of the walls of housing 210 to further the illusion that the disks 220, 320 are formed of water.

The bottom or lower portions of the disks 220, 320 may also be hidden from view within the housing 210 or its walls. This may be used to hide the full shape or size of the disks 220, 320 such as by providing the appearance that the disks 220, 320 are only a partial disk or fan as would be the case for a fountain. To this end, the base housing 210 may have walls or other components to hide at least about one fourth of the disks 220, 320 (e.g., a wall that extends at least about 0.25 times the OD of the disks 220, 320 above a lower edge 228, 328 of the disks 220, 320 (or lower point in a rotation of a moving 221, 321 disk 220, 320)), but a specific amount that may be hidden from view may depend on a variety of design parameters such as whether viewers are below, on the same level, or above the housing 210 as this will effect a viewer's line of sight to the disks 220, 320.

The disks 220, 320 are spun or rotated 221, 321 by a drive assembly 240 that is hidden out of sight of viewers such as beneath the platform 214 on mounting structure 246. In the embodiment shown in FIGS. 2 and 3, the drive assembly 240 includes a first drive wheel 244 driven by motor 242. The wheel 244 abuts the sidewall 228 of disk 220 such that when the wheel 244 rotates as shown at 245 the disk 220 rotates, too, but in the opposite direction as shown at 221 about a hub or axle 350, which may extend through the center of the disk 220 (as well as through the center of disk 320 such that the disks 220, 320 rotate about a common rotation axis). Similarly, the drive assembly 240 may include a second drive wheel 344 that abuts/contacts (or engages) the disk 320 such that when the wheel 344 is rotated 345 by a drive motor 342 the disk 320 also rotates 321 but in an opposite direction relative to the drive wheel 344. The motors 242, 342 may be operated to spin in opposite directions such that the drive wheels 244, 344 and, hence, driven disks 220, 320 counter rotate as shown at 221, 321.

As discussed with reference to FIG. 1, the rate of rotation 221, 321 may vary to create a desired effect but typically may range from about 10 to 40 RPM with some embodiments having rotation rates of 20 to 30 RPM. Likewise, the rates of rotation 221, 321 may be substantially similar or even nearly equivalent (e.g., both disks 220, 320 rotating at about 25 RPM) or may differ slightly from each other (e.g., differ by less than about 7 RPM such as less than 4 RPMs such that a human eye cannot detect the existence of two separate, spinning disks). To hide rotational hub 350 and vertical support of the disks 220, 320 within assembly 200, hub covers or enclosures (or sculptural elements) 230, 330 may be provided to conceal the hub 350, which typically will extend through both disks 220, 320. The covers/enclosures 230, 330 may also be chosen to contribute to the theme of the water disk effect such as by providing a reason for the water disk (e.g., a tail of a peacock or the like).

As discussed with reference to FIG. 1, the disks 220, 320 may have a similar design and configuration but be positioned to face opposite directions and be counter rotated (e.g., rotation directions 221, 321 differ or are in opposition about hub 350). Each disk 220, includes an outer surface or side 222, 322 that is textured with a pattern of side-by-side but spaced apart ridges or ribs 224, 324, which each are raised or protruding some distance from the body of disks 220, 320 (such as up to 1 inch or more depending on the thickness of the body of the disks to provide a desired amount of relief or topography for light refraction to achieve a water-like effect). In between each ridge 224, 324, the outer surface/side 222, 322 is a rippled or textured surface (or valley) 225, 325, with a much smaller relief (such as up to 10 to 30 percent of the relief or height of ridges 224, 324) but providing varying refractive surfaces to better simulate water effects with disks 220, 320. The edges or sidewalls 228, 328 of the disks 220, 320 may also be serrated or irregular as shown to further the simulation of a non-perfect water effect and to disguise use of solid disks in assembly 200.

As shown in FIG. 2, the bowed/arcuate and raised/protruding ridges 224, 324 may each be similar in shape and size but often some variance between the ridges is intentionally provided to imitate the imperfect sprays achieved by a water fountain (e.g. the curvature or radius may not be repeated for each ridge 224, 324, the reach or lengths may be varied, and so on). In one embodiment, the surface 222, 322 is patterned by setting a particular pattern of ridges 224, 324 and textured valleys 225, 325 for each quadrant and then four identical quadrants are used to create a mold for forming the disk 220, 320 (which provides a balanced disk 220, 320 for rotation and a repeating water effect with desired light refraction/transmission). Transmission or refraction of light is further controlled by having each disk 220, 320 include a planar or substantially flat/smooth inner surface 223, 323, and these two surfaces 223, 323 are positioned adjacent or facing each other with a small gap 320 (to facilitate counter rotation of the disks 220, 320). In use, refraction of light 206 occurs mainly at the surfaces 222, 322 and due to the pattern or 3D topography of these surfaces 222, 322 and not at inner surface/sides 223, 323.

FIG. 4 illustrates the assembly 200 without the housing 210 showing use of the assembly 200 to create a water disk or fan effect. As shown, the existence of the ribs/ridges 224, 324 and contoured/rippled valleys 225, 325 provides an appearance of a wall or disk of water rather than two spinning disks 220, 320. This is believed to be due to the use of two counter rotating disks 220, 320 that are patterned as described. Note, the reverse or opposing positioning of the disks 220, 320 on the hub 350 causes the curved or arcuate ridges 224, 324 to face in opposite directions (e.g., with their convexness or bow in opposite directions). For example, when the assembly 200 is viewed from the side of the disk 220, the ridges 224 of disk 220 bow or curve to the left while the ridges 324 of the disk 320 bow or curve to the right.

During operation, the disks 220, 320 are rotated 221, 321 in a direction that coincides or matches the direction of the ridges 224, 324, e.g. with the rotation 221 being to the left or counterclockwise while the rotation 321 is to the right with the bowing of the ridges 324 or clockwise. When light 206 from source 204 passes through the disks 220, 320, a viewer's eyes tend to watch or view the interference between pairs of ridges 224, 324 in the counter rotating disks 220, 320. For example, as the disks rotate 221, 321 a pair of adjacent ridges 224, 324 may have their base portions first overlapping or interfering and then their middle portions followed by their tips. This interference in the transmission of light 206 happens rapidly and in a repeated manner for adjacent pairs of ridges 224, 324 such that the viewer believes they see jets of water shooting outward from the base housing 210 with radial flow. The material(s) used to form the disks 220, 320 may be the same for each disk, and it is typically selected to provide an index of refraction that is similar to water's index of refraction (such as within 20 to 30 percent of the index of refraction of water), with some embodiments using materials that provide an index of refraction of at least about 1.3. For example, the disks 220, 320 may be formed of glass, ceramic, acrylic, plastic, or the like (such as from a water clear, UV-stabilized urethane resin or the like).

As can be understood from the above discussion of the systems 100 and 200, the water disk effect is achieved by providing two disks made of a durable material with that is about as clear or transmissive of light as water such as certain acrylics, classes, and other materials. The disks each have water, spiral patterns sculpted onto the outer surfaces or outer faces of the disk bodies. The inner faces of each disk are flat, which forces light traveling through the disks to distort and bend the same way or in a similar manner that light bends as it passes through water. The disks are rotated in opposite directions about a common rotation axis to cause the patterns on the outer surfaces to create the illusion of outward movement. Because the disks are made of a material that mimics the color and light transmission qualities of water, the effect appears to be radially outward moving water. The point of rotation between the disks may be covered to hide the mechanism that turns the disks. The lower portion of the disks (such as at least one fourth) may be obscured or hidden from view, thereby forcing the viewers to imagine or believe that the "water" is dropping out of sight into the supporting base or pool of water of a "fountain."

Figure 5:
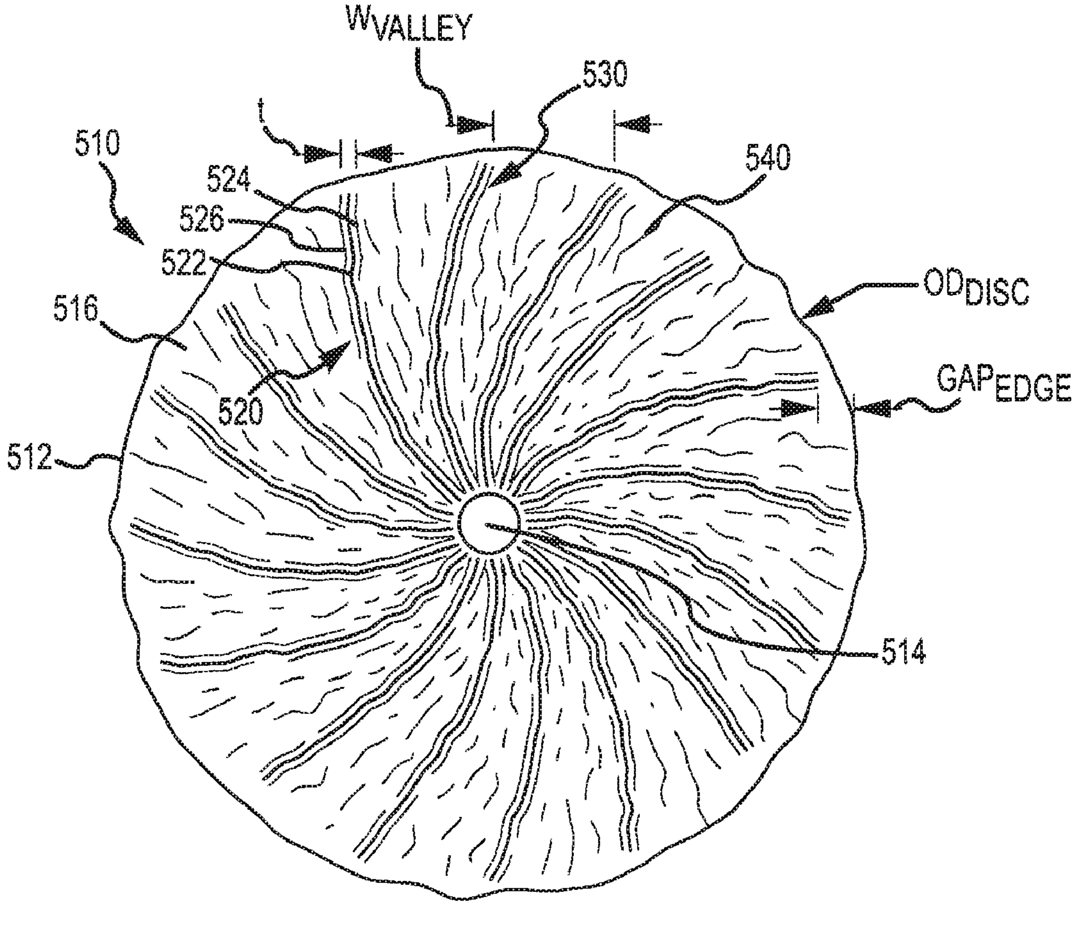
FIG. 5 illustrates a plan view of a disk showing the textured or outer side of the disk showing one useful pattern of raised or protruding, arcuate ridges arranged about a center hole (for receiving a rotational axle or hub) in a spiral or whirlpool pattern and including a textured surface between adjacent ridges (e.g., in some embodiments, the valley between each pair of adjacent ridges or ribs may be contoured or have an irregular 3D topology rather than simply being smooth or planar)

FIG. 5 illustrates an exemplary disk 510 that may be used for the two disks in a water disk effect assembly (such assemblies 100, 200). The disk 510 may have a body with an OD, $OD_{Disk}$, that will vary to suit an application from several inches in a desk top or toy application to several feet (e.g., 2 to 7 feet or more) for a larger indoor or an outdoor implementation (such as for an amusement park ride, for a building water effect, and so on). The body of the disk 510 may have an irregularly shaped or textured edge or sidewall 512 with a thickness of less than one inch up to several inches (as measured from a flat or planar back or inner surface (not shown in FIG. 5) to the outer face or outward facing surface 516). The body of the disk 510 is formed of materials with colors and transmissivity similar to water (e.g., light blue or green (or colorless) glass or plastic with an index of refraction near 1.3 or the like).

The outer face or surface 516 is textured to have a 3D topography with a pattern of a plurality or set of raised ridges 520, which may have a height or relief of 25 to 50 percent of the thickness of the disk body (such as 0.75 inches when the disk 510 is 2 inches thick in one embodiment). As shown, each ridge element 520 includes a central ridgeline or top/peak 522 with an arcuate or bowed shape and a pair of ridge bottoms or edges 524, 526, which are also bowed or arcuate. The ridge element 520 may have a thickness, t, that is measured from ridge bottom/edge 524 to ridge bottom/edge 526, and this thickness, t, may be constant along the length of the ridge element 520 or may be smaller near a center hole/opening 514 (used to rotatably mount the disk 510 in an assembly).

Each neighboring or adjacent ridge/rib element 530 is also arcuate and is spaced apart from the ridge element 520 to define a valley with a width, $w_{Valley}$, which as with the thickness, t, may increase in size with distance from the center hole 514 to simulate radially sprayed and/or rotated water jets. The valley typically will include a contoured or rippled surface 540 (random 3D topography) that acts to refract received light in an unpredictable or irregular manner as is the case with water dispersed in a fountain between water jets or in a wall/sheet of water. Each ridge 520, 530 may extend completely from the center hole 514 to the edge or sidewall 512 or may be spaced apart from both or at least the edge/sidewall 512 a distance, $gap_{Edge}$, defining a gap and this gap distance may be varied among the ridge elements 520, 530 to further the illusion of varying shape and size of ridge or raised elements 520, 530 as may occur in a water-based fountain.

The specific magnitude of these dimensions/parameters as well as the particular radius or amount of curvature of the arcuate ridge elements 520, 530 may be varied widely to practice the invention. However, FIG. 5 is useful for showing that the ridge elements 520, 530 typically are not planar elements but slope downward into a valley from a ridgeline 522 and for showing that there is often a gap or spacing between adjacent or neighboring ridge components 520, 530 so as to define separate "jets" of water with the space or valley between being, in some cases, textured to provide a more continuous water distortion effect with transmittal of incident light.

Figure 6:
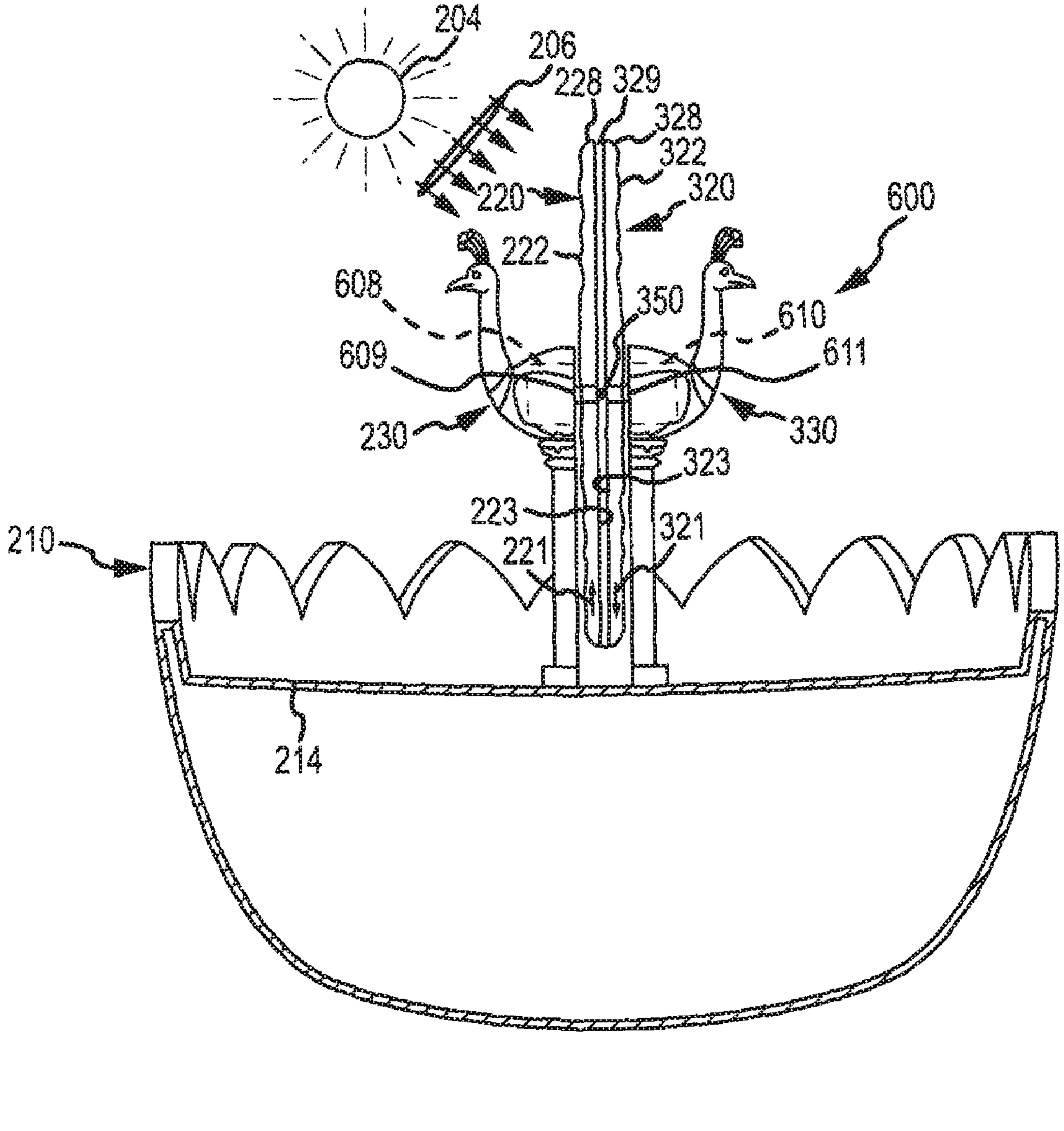
FIG. 6 illustrates a water disk effect assembly similar to that shown in FIGS. 2-4 showing use of an alternative drive assembly to provide opposing or counter rotation of the two textured/patterned disks.

The technique or method used to drive or rotate the disks in differing directions may also be varied to practice the invention. FIG. 6 illustrates a water disk effect system 600 with similar components as found in system 200 but with a differing drive configuration. As shown, the pair of disks 220, 320 is again mounted within a housing 210 that hides the lower portions and provides for concurrent rotation about a common rotation axis with central axis component or hub 350 supporting both the disks 220, 320. In this system 600, a pair of motors 608 and 610 is mounted within the hub enclosures 230, 330 and mechanically connected to or linked to the disks 220, 320 to selectively rotate 221, 321 the disks at the same or differing rotation rates and in differing/opposite directions as shown about hub 350.

In some cases, the motors 608, 610 may be electric motors or other motors (or similar devices) that may be operated separately or in linked manner to counter rotate the disks 220, 320 (such as at substantially equal (within a few RPMs) rotation rates in the range of 20 to 30 RPMs or the like). The motors 608, 610 may also be adapted for remote operation based on power or control signals, and the motors 608, 610 may be operable at two or more speeds to allow tuning of the rotations 221, 321 to suit a particular application (e.g., to tune the rotation rate based on the textured surfaces 222, 322, the lighting 206, and other operating parameters that may affect achieved optical effects).

Figure 7:
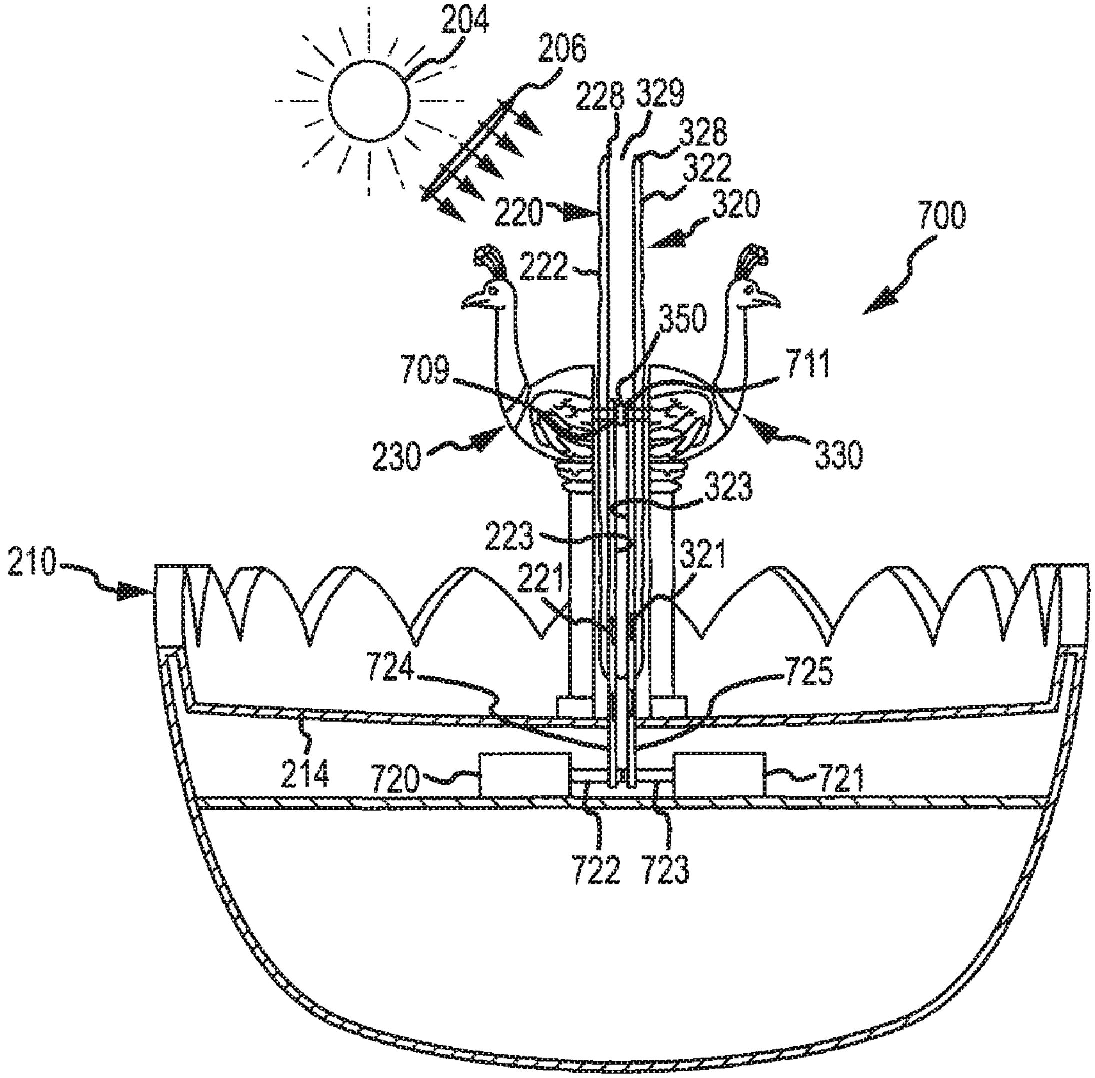
FIG. 7 illustrates another water disk effect assembly similar to that shown in FIGS. 2-4 and 6 showing use of another drive assembly using belts to provide counter rotation of the pair of disks.

FIG. 7 illustrates another water disk effect assembly 700 that includes similar components (with like numbering) as assemblies 200 and 600 but with a differing drive arrangement for disks 220, 320. Specifically, the assembly 700 includes a pair of motors 720, 721 within housing 210 that are separately operable at the same or differing speeds to impart counter rotation 221, 321 of the disks 220, 320. This may be achieved by rotation of a shaft or gears/sprockets 722, 723 to drive belt, chains, gear trains, or the like 724, 725 to rotate the disks 220, 320 via shafts or hub stubs 709, 711 that are affixed or mated with the disks 220, 320 (such as pivotally supported upon the shaft or hub 350, which in turn is supported by enclosures 230, 330). Again, the rotations 221, 321 are in opposite directions and may be the same or nearly so (such as a rotation rate selected from the range of 10 to 40 RPMs) or intentionally differing (e.g., disk 220 may rotate 221 at a fixed rate (such as 25 RPM) while disk 320 may rotate 321 in the opposite direction at a fixed rate within several RPMs of disk 220 (such as a rate in the range of 22 to 28 RPMs) or at a rate that is varied over time about the rate of disk 220 (such as within the range of 23 to 27 RPMs or the like)).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. Many of the specific examples described the use of the counter-rotating disks to simulate a fan-shaped fountain of water, but the concepts are equally applicable to other liquids. The fan-shaped fountain effect may be used to look like nearly any transparent to translucent liquid by adjusting the patterns on the disk surfaces and/or adjusting design parameters such as the index of refraction, the color of the disk bodies, the rotation rates, and so on. If it were desirable for the disks to be used to simulate a fan of a thicker or more viscous material such as honey, the disks may be formed from a honey-colored material with a refraction of index similar to honey. The disks may be shaped with slightly broader and "gooier" patterns of ridges, with the disks rotated at slower rotation rates (or toward the lower end of the ranges provided herein).

I claim:

1. An apparatus for providing a water disk effect, comprising:

a first disk;

a second disk, wherein the first and second disks each have a first side with a substantially planar surface and a second side with a surface textured with a three dimensional (3D) pattern including ridges and valleys and wherein the first and second disks are at least translucent to light;

a housing supporting the first and second disks, wherein the first and second disks are mounted for independent rotation about a common rotation axis extending through a center of each of the disks and wherein the first side of the first disk is positioned adjacent and proximate the first side of the second disk, whereby the second sides of the first and second disk face outward in the apparatus; and a drive assembly adapted for rotating the first disk in a first direction about the rotation axis and for concurrently rotating the second disk in a second direction about the rotation axis that is opposite the first direction, wherein the index of refraction of at least the first and second disks is substantially identical and wherein paired, adjacent portions of the 3D pattern on the first and second disks produce interference during light transmission through the first and second disks.

2. The apparatus of claim 1, wherein the 3D pattern comprises a plurality of arcuate ridges extending generally from a center of the first and second disks toward an outer edge.

3. The apparatus of claim 2, wherein the arcuate ridges of each of the first and second disks are curved in a common direction relative to the center of the disk.

4. The apparatus of claim 3, wherein the common curve direction coincides with the first direction of rotation for the first disk and the common curve direction coincides with the second direction for the second disk.

5. The apparatus of claim 2, wherein the 3D pattern further comprises an irregular textured surface in a gap between each adjacent pair of the arcuate ridges.

6. The apparatus of claim 2, wherein the arcuate ridges on each of the disks have a height of at least about 25 percent of a thickness of each of the disks.

7. The apparatus of claim 1, wherein the first and second disks are formed from a material with an index of refraction of at least about 1.3.

8. The apparatus of claim 1, wherein the drive assembly comprises a first drive mechanism driving the first disk in the first direction at a rotation rate in the range of about 20 to about 30 revolutions per minute and a second drive mechanism driving the second disk in the second direction at a rotation rate in the range of about 20 to about 30 revolutions per minute (RPM).

9. The apparatus of claim 8, wherein the rotation rates of the first and second disks differs by less than about 3 RPM.

10. The apparatus of claim 1, further comprising an axle for supporting the first and second disks and extending through the centers of the first and second disks, wherein the housing further includes an enclosure assembly extending over the axle proximate to the second side of the first and second disks, and wherein the disks are supported such that at least one fourth of the disks extend into the housing.

11. The apparatus of claim 1, wherein at least a bottom fourth of the first and second disks extends into the housing during rotation by the drive assembly, whereby view of the at least bottom fourth is hidden from view.

12. A system for providing a water-like visual effect, comprising:

a pair of planar disks pivotally supported on an axle and arranged parallel to each other, wherein each of the disks includes an outer surface with a set of side-by-side, raised, arcuate elements and wherein each of the disks is at least translucent to light such that light striking one of the outer surfaces passes through both of the disks;

a first drive mechanism spinning a first of the planar disks in a first direction about the axle; and a second drive mechanism concurrently spinning a second of the planar disks about the axle in a second direction opposite the first direction, wherein the arcuate elements on the first of the planar disks are all convex in a first direction and the arcuate elements on the second of the planar disks are all convex in a second direction that is opposite the first direction of the arcuate elements, wherein the first direction of the arcuate elements corresponds to the first direction of rotation, and wherein the second direction of the arcuate elements corresponds to the second direction.

13. The system of claim 12, wherein the planar disks comprise a body with an index of refraction of at least about 1.3.

14. The system of claim 12, wherein the first and second planar disks are rotated at rates in the range of 10 to 40 RPM.

15. An optical effect apparatus, comprising:

a first disk with a planar body having a side with a 3D topography including a plurality of arcuate ridges arranged to be spaced apart and side-by-side about a center point of the first disk, the planar body being translucent to light and having an index of refraction of at least about 1.3;

a second disk with a planar body having a side with a 3D topography including a plurality of arcuate ridges arranged to be spaced apart and side-by-side about a center of the second disk, the planar body being translucent to light and having an index of refraction of at least about 1.3;

a support structure supporting the first and second disks for independent rotation about a rotation axis extending through centers of the first and second disks, wherein the first and second disks are positioned to be parallel to each other with the sides with the 3D topography facing outward; and a drive assembly adapted to rotate the first disk at a first rotation rate in a first direction about the rotation axis and to concurrently rotate the second disk at a second rotation rate in a second direction about the rotation axis, the first direction being opposite the second direction.

16. The apparatus of claim 15, wherein the arcuate ridges of the first disk are bowed outward in a first direction coinciding with the first direction of rotation and wherein the arcuate ridges of the second disk are bowed outward in a second direction coinciding with the second direction of rotation when the first and second disks are viewed along the axis of rotation.

17. The apparatus of claim 15, wherein the first and second rotation rates are in the range of about 20 to about 30 RPM and wherein the first rotation rate is within about 3 RPM of the second rotation rate.

18. The apparatus of claim 15, wherein the first and second disks each further includes a side, opposite the side with the 3D topography, that has a substantially planar surface and wherein the planar surfaces of the first and second disks are spaced apart.

19. The apparatus of claim 15, further including a housing and wherein the first and second disks extend into the housing such that at least about one fourth of the first and second disks are contained within the housing as measured by the outer diameter of the first and second disks, whereby at least a lower portion of the first and second disks is concealed from view during use of the apparatus.

* * * * *